US009069968B2

(12) United States Patent
Aad et al.

(10) Patent No.: US 9,069,968 B2
(45) Date of Patent: Jun. 30, 2015

(54) METHOD AND APPARATUS PROVIDING PRIVACY BENCHMARKING FOR MOBILE APPLICATION DEVELOPMENT

(75) Inventors: Imad Aad, Preverenges (CH); Debmalya Biswas, Lausanne (CH); Frank Dawson, Jr., Southlake, TX (US); GianPaolo Perrucci, Lausanne (CH)

(73) Assignee: Nokia Technologies Oy, Espoo (FI)

( * ) Notice: Subject to any disclaimer, the term of this patent is extended or adjusted under 35 U.S.C. 154(b) by 452 days.

(21) Appl. No.: 13/361,152

(22) Filed: Jan. 30, 2012

(65) Prior Publication Data
US 2013/0198849 A1    Aug. 1, 2013

(51) Int. Cl.
*G06F 21/57* (2013.01)
*G06F 11/36* (2006.01)
*G06F 21/62* (2013.01)
*G06F 9/44* (2006.01)

(52) U.S. Cl.
CPC .......... *G06F 21/577* (2013.01); *G06F 11/3692* (2013.01); *G06F 21/6245* (2013.01); *G06F 8/33* (2013.01)

(58) Field of Classification Search
CPC ..... G06F 9/44; G06F 21/6245; G06F 21/577; G06F 11/2668; G06F 11/362
See application file for complete search history.

(56) References Cited

U.S. PATENT DOCUMENTS

| 2003/0033516 | A1* | 2/2003 | Howard et al. ............... 713/152 |
| 2007/0157311 | A1* | 7/2007 | Meier et al. ..................... 726/22 |
| 2007/0162890 | A1* | 7/2007 | Meier et al. .................. 717/100 |
| 2009/0083695 | A1* | 3/2009 | Mir et al. ...................... 717/104 |
| 2010/0103117 | A1* | 4/2010 | Townsend et al. ............ 345/173 |
| 2011/0093955 | A1* | 4/2011 | Chen et al. ...................... 726/25 |
| 2011/0258621 | A1* | 10/2011 | Kern ................................. 718/1 |
| 2012/0220263 | A1* | 8/2012 | Smith et al. ................... 455/410 |

OTHER PUBLICATIONS

Gilliam, et al. "Software Security Checklist for the Software Life Cycle," WETICE'03, IEEE Computer Society, 2003.*
Curphey, et al. "Web Application Security Assessment Tools," IEEE Security & Privacy, pp. 32-41, 2006.*
ENISA, "Smartphone Secure Development Guidelines," Nov. 25, 2011.*
"Qt Mobility Project Reference Documentation", http://doc.qt.nokia.com/qtmobility-1.2/index.html; Jan. 24, 2012, 5 pgs.
"A Window Into Mobile Device Security", Carey Nachenberg, Symantec Security Response, 2011, 23 pgs.
"Unified Modeling Language", Wikipedia, Jan. 4, 2012, 26 pgs.

* cited by examiner

*Primary Examiner* — Jung Kim
*Assistant Examiner* — Robert Leung
(74) *Attorney, Agent, or Firm* — Harrington & Smith

(57) ABSTRACT

A method operates, during development of an application program intended to be run on a mobile user device, to perform a computer assisted analysis of the application program to determine at least one user privacy-related aspect of the application program; and to present the determined at least one user privacy-related aspect. The determined at least one user privacy-related aspect may be presented to a developer of the application program An apparatus and system for performing the method are also disclosed.

25 Claims, 7 Drawing Sheets

| Category | Attribute | GPS | WiFi (MAC) | BT | CELL ID | CALL LOGS | SMS | AUDIO | ACCELEROMETER | ADDRESS BOOK | CALENDAR | PICTURE | MUSIC | IMEI | IMSI | DEVICE PROFILE | RING TYPE | BATTERY LEVEL | CHARGING INDICATOR | ... |
|---|---|---|---|---|---|---|---|---|---|---|---|---|---|---|---|---|---|---|---|---|
| FINANCIAL | ... | | | | | | | | | | | | | | | | | | | |
| FINANCIAL | FISCAL FRAUD | | | | | × | × | × | | × | | | | | | | | | | |
| FINANCIAL | INVESTMENT | × | | | | × | × | × | | × | | | | | | | | | | |
| FINANCIAL | FORTUNE | × | | | | × | × | × | | × | | | | | | | | | | |
| MEDICAL | ... | | | | | | | | | | | | | | | | | | | |
| MEDICAL | VACCINATIONS | | × | | | | × | × | | | | | | | | | | | | |
| MEDICAL | DISEASES | × | × | | × | × | × | × | | × | | | | | | | | | | |
| MEDICAL | EXPECTED LIFETIME | × | × | | | | × | × | | | | | | | | | | | | |
| LOCATION | ... | | | | | | | | | | | | | | | | | | | |
| LOCATION | ENTERTAINMENT | × | × | × | × | | | × | × | | | | | | | | | | | |
| LOCATION | WORK | × | × | × | × | | | | | | | | | | | | | | | |
| LOCATION | HOME | × | × | × | × | | | | | | | | | | | | | | | |
| LOCATION | LOCATION ITSELF | × | × | × | × | | | | | | | | | | | | | | | |
| SOCIAL CONNECTIONS | ... | | | | | | | | | | | | | | | | | | | |
| SOCIAL CONNECTIONS | FREQ. OF INTERACTIONS | × | × | | × | × | × | × | | × | × | | | | | | | | | |
| SOCIAL CONNECTIONS | TYPE OF CONNECTION | | × | | | × | × | × | | × | × | | | | | | | | | |
| SOCIAL CONNECTIONS | # OF CONNECTIONS | × | × | | × | × | × | × | | × | × | | | | | | | | | |
| SOCIAL CONNECTIONS | WITH WHOM | × | × | | × | × | × | × | | × | × | | | | | | | | | |
| CONTEXT | ... | | | | | | | | | | | | | | | | | | | |
| CONTEXT | MOOD | | | | | | × | × | | × | | | | | ... | | | | | |
| CONTEXT | ACTIVITY | × | × | × | × | | | × | × | | × | | | | | | | | | |
| CONTEXT | TRANSPORTATION MEANS | × | × | × | × | | | × | × | | × | | | | | | | | | |
| PROFESSIONAL | ... | | | | | | | | | | | | | | | | | | | |
| PROFESSIONAL | COLLABORATIONS | × | × | × | × | × | × | × | | × | × | | | | | | | | | |
| PROFESSIONAL | PROFESSION | × | × | × | × | × | × | × | | × | × | | | | | | | | | |
| PERSONAL | ... | | | | | | | | | | | | | | | | | | | |
| PERSONAL | ETHNICITY | × | × | × | × | × | × | × | | × | | | | | | | | | | |
| PERSONAL | SEXUAL PREFERENCE | × | × | × | × | × | × | × | | × | | | | | | | | | | |
| PERSONAL | MARITAL STATUS | | × | × | | × | × | × | | × | × | | | | | | | | | |
| PERSONAL | RELIGION | × | × | × | × | × | × | × | | × | × | | | | | | | | | |
| PERSONAL | AGE | | × | | | × | × | × | | × | | | | | | | | | | |
| PERSONAL | GENDER | | × | × | | × | × | × | | × | | | | | | | | | | |

METHOD AND APPARATUS PROVIDING PRIVACY BENCHMARKING FOR MOBILE APPLICATION DEVELOPMENT

TECHNICAL FIELD

The exemplary and non-limiting embodiments of this invention relate generally to user devices, methods and computer programs and, more specifically, relate to control of a user's personal data that is resident on a user's device and to tools for mobile application developers to ensure the control user personal data.

BACKGROUND

Modern user devices such as phones (e.g., smartphones), tablets, notebooks, electronic readers and the like typically include, in addition to wireless communication capabilities, one or more sensors that can detect and/or infer the context of the device and, by extension, contextual information of the user. One example is the use of a position or location determining sensor such as one embodied as a global positioning satellite (GPS) receiver and sub-system. Another example is an orientation sensor whereby it can be determined how the user has oriented a display screen (e.g., longest dimension vertically or horizontally).

In addition to the large amount of personal data stored on these user devices (sms logs, call logs, contacts list, etc.) many sensors can be used to infer the location, context, personal habits, etc. of the user. All of this information has the potential to be exposed to privacy threats, such as third party applications (apps) that the user installs.

SUMMARY

The foregoing and other problems are overcome, and other advantages are realized, in accordance with the exemplary embodiments of this invention.

In a first aspect thereof the exemplary embodiments of this invention provide a method that comprises developing an application program intended to be run on a mobile user device, performing a computer assisted analysis of the application program to determine at least one user privacy-related aspect of the application program; and presenting the determined at least one user privacy-related aspect.

In another aspect thereof the exemplary embodiments of this invention provide an apparatus that comprises a processor and a memory that includes computer program code. The memory and computer program code are configured to, with the processor, cause the apparatus to develop an application program intended to be run on a mobile user device, to perform an analysis of the application program to determine at least one user privacy-related aspect of the application program; and to present the determined at least one user privacy-related aspect.

BRIEF DESCRIPTION OF THE DRAWINGS

The foregoing and other aspects of the exemplary embodiments of this invention are made more evident in the following Detailed Description, when read in conjunction with the attached Drawing Figures, wherein:

FIG. 1 is a block diagram of a mobile device that is one suitable target device for an application developer to write an application for.

FIG. 3 is a screenshot that shows an example of Qt Mobility APIs with feedback concerning the privacy sensitivity of each API integrated into Qt Creator.

FIG. 5 reproduces FIG. 4 from U.S. patent application Ser. No. 13/341,290 and shows an exemplary and non-limiting example of a privacy matrix.

DETAILED DESCRIPTION

Figure 1:
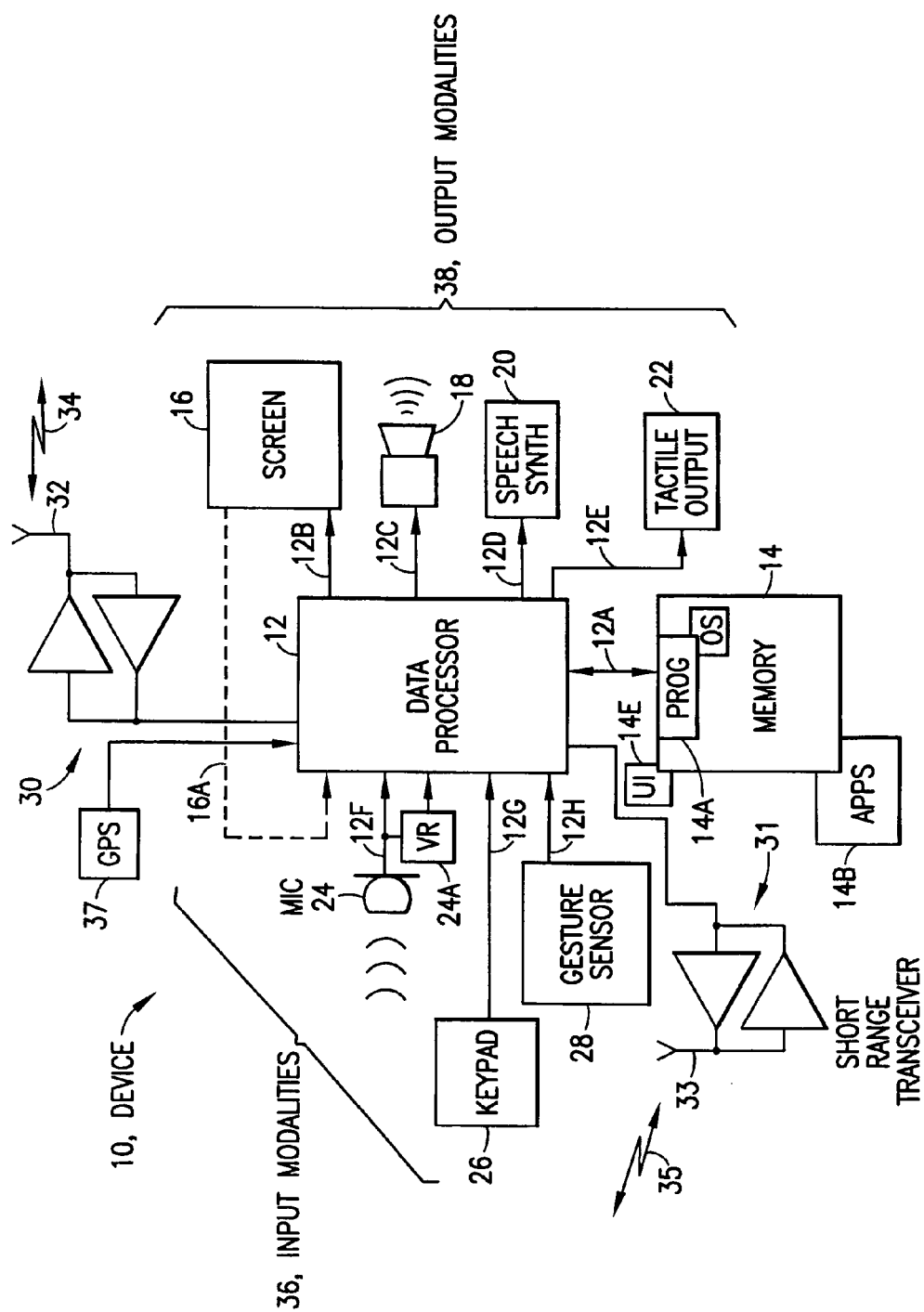

For the purposes of describing the embodiments of this invention a 'smartphone' may be considered as a mobile user communication device having a user interface, at least one wireless communication modality and sufficient memory capacity and data processing capability for storing and executing application programs in cooperation with an operating system.

In accordance with increasing privacy awareness among users, privacy will soon become a differentiating feature for mobile device (e.g., smartphone) application programs (apps), and tools are needed to support the app developers in developing privacy compliant apps making efficient use (only as much as needed with explicit permission) of user personal information. The exemplary embodiments of this invention provide tools that may be Integrated with a Development Editor (IDE) to support app developers with respect to privacy aspects during the entire app development phase, from i.e., from design to deployment.

The increasing importance of privacy features for users has a direct bearing on the app development process. The apps will need to be privacy compliant, or privacy efficient (use only as much personal information as is needed), and have a good privacy "rating" to be attractive to users. One problem that arises is that many mobile app developers come from a desktop programming background and do not appreciate the privacy issues specific to mobile devices such as smartphones.

Various challenges include:

the integration of privacy safeguards early in the app development (preferably design) process;

providing privacy-unaware developers a measure of the privacy sensitiveness of different types of user data collected from the mobile device;

for multi-platform apps, simulating the privacy rating that the app will receive on different platforms, allowing developers the opportunity to fine-tune the apps before actually deploying them at the respective app stores; and detecting (possibly unintentional) privacy leaks and potential privacy liabilities that can occur during execution of the app code in a target device.

The exemplary embodiments are implemented as security related tools Integrated into the Development Editor (IDE). One exemplary type of target development software may be Secure Development Lifecycle (SDL) tools for a Visual Studio IDE provided by Microsoft. SDL provides security tools to aid the developer during the full product lifecycle starting from design templates, to code scanning during development, to final security testing.

The exemplary embodiments of this invention improve on any existing types of security-related types of tools in at least the privacy aspects and in the intended target device (e.g., smartphone) of interest.

The exemplary embodiments of this invention are targeted towards analyzing the privacy of apps, and not the security per se as in conventional app development tools. 'Privacy' may be differentiated from 'Security' as follows: the amount of sensor data (e.g. sensor types, frequency) accessed by an app and the personal information that can be inferred from this sensor data falls under the realm of Privacy, while of lesser interest are the security aspects such as whether a particular app is authenticated properly before access, or if it does or does not store/transmit the accessed information in an encrypted fashion, as two non-limiting examples associated with 'security'.

The exemplary embodiments of this invention are further targeted towards mobile devices, e.g., smartphones, versus desktop-type devices such as PCs. The privacy-related tools in accordance with the exemplary embodiments are specific to smartphones as compared to conventional application development tools which are conventionally targeted towards applications running on a computer. Smartphones have certain novel aspects both in terms of the input sources of information (e.g., sensors) and their usage (e.g., orientation, physical proximity to the user, etc.), which are not generally relevant for desktop application programs.

The examples of embodiments of this invention provide a privacy 'add-on' or a privacy enhancement for an IDE to a support mobile app software developer during the full development lifecycle with respect to privacy related analysis of the app. The privacy enhancement may be referred to below as a 'Privacy Benchmark Tool' or PBT. The development lifecycle during which the PBT can be used may include at least the following events/tasks.

(A) Design: The PBT enables performing a static analysis based on application program interfaces (APIs) that are invoked to analyze the privacy impact of the app, and enable suggesting less privacy sensitive alternative APIs (if any).

(B) Development (Coding): The PBT enables performing code scanning to detect privacy leaks.

(C) Testing: The PBT enables performing privacy threat analysis for different test cases taking into consideration runtime characteristics such as, but not limited to, the frequency of accessing different sensors. In general, the PBT enables performance of monitoring the run-time behavior of the apps with respect to data access on the smartphone and any related privacy implications.

(D) Deployment: The PBT enables performing, for multi-platform apps using different privacy models, the computation of a privacy rating that the app will receive if deployed as is (e.g., at the respective app stores), with possible recommendations to improve the privacy rating.

As was mentioned above, with smartphones and other user devices becoming ubiquitous, the sensors present in these devices can be used to infer very personal real-time contextual information about the user, e.g., location, activities, habits (habitual behaviors). Having access to this wealth of information about the user allows service providers to provide highly context sensitive services to the user. However, many users are reluctant to share this information due to the considerable privacy implications if this data is compromised and misused.

In this discussion "sensors" are assumed to also refer to various input devices available in the smartphone (e.g., a microphone, a camera), and a file system of the smartphone that in general allows access to user-generated content (e.g., pictures).

Before describing the exemplary embodiments of this invention in further detail reference is made to FIG. 1 for illustrating a simplified block diagram of an exemplary embodiment of an electronic device 10 (embodied for example as a smartphone) that is but one suitable target platform for an application software developer (app developer) that uses the PBT in accordance with the exemplary embodiments of this invention.

In FIG. 1 the device (smartphone) 10 includes a data processor 12 that is coupled through a bus 12A with a memory 14 that stores a program (PROG) 14A of instructions that are executable by the data processor 12. The program 14A can include an operating system (OS) and other programs needed to operate the device 10. The device 10 may further include a plurality of input and output devices and subsystems, referred to herein also as input modalities 36 and output modalities 38. As exemplary output devices there may one or more of a visual display screen 16, such as an LCD or a plasma display screen, an acoustic output transducer such as a loudspeaker 18, a speech synthesis subsystem 20 having an output that can be played through the loudspeaker 18 (or through another acoustic output transducer), and a tactile output device or transducer 22, such as a vibratory device (e.g., a piezoelectric transducer). These output devices are coupled to corresponding output paths 12B, 12C, 12D and 12E from the data processor 12. As exemplary input devices there may one or more of an acoustic input transducer such as a microphone 24, an associated speech or voice recognition function (VR) 24A, a keypad or keyboard 26 and a gesture sensor 28, such as a device that is responsive to a rotation about at least one axis and/or to a force applied by a user's finger or stylus, such as when making a tapping gesture. These input devices are coupled to corresponding input paths 12F, 12G and 12H to the data processor 12. If the screen 16 is a touch-sensitive screen then there may also be an input 16A from the screen 16 to the data processor 12. In this case the input to the data processor 12 may represent activation of a virtual key or button by the user, as opposed to the use of the keypad/keyboard 26 where the input signal may represent activation of a physical key or button (such as an alphanumeric key or a physical 'soft' key or button). The microphone 24 may be coupled with the speech recognition functionality of the device 10 (the VR 24A) whereby a word or words spoken by the user can be interpreted by the data processor 12 as representing a command.

It should be appreciated that the data processor block 12 may actually comprise a number of circuit types, in addition to a data processor per se, such as analog-to-digital converters and digital-to-analog converters that support the operation of the various input modalities 36 and output modalities 38.

Some type of location determination sub-system can be provided, such as a GPS receiver 37.

It should be appreciated that at least some of the input modalities 36 can be considered as being sensors of the device 10 such as, as non-limiting examples, the microphone 24, the gesture sensor 28 and the GPS sub-system 37. Other examples of sensors that can be provided are described below. That is, the depiction of the device 10 shown in FIG. 1 is exemplary, as the sensors and sensor-related functions (e.g., device-related information that could be accessed or interrogated by an application program (app) 14B), can include, as non-limiting examples, GPS, WiFi, BT, Cell ID, Call logs, SMS (short message service), Audio, Accelerometer, Address book (contact information), Calendar, Picture, Music, IMEI (International Mobile Equipment Identity), IMSI (International Mobile Subscriber Identity), Device profile, Ring type, Battery (charge) level and Charging indicator.) Any one of these various functional units and user or device related information can be referred to simply as a "sensor".

In the exemplary embodiments the device 10 has user communication capabilities and includes a suitable transceiver 30, such as a radio frequency transceiver coupled with at least one antenna 32 for conducting wireless communications through a bidirectional long range radio frequency link 34 (e.g., a link to a cellular communication network). The cellular communication network can be compliant with any type of cellular communication network including, for example, GSM, LTE, LTE-A, and so forth. That is, the use of this invention is not contingent on the use of any particular type of cellular network. The device 10 can also include a second transceiver 31 coupled with at least one antenna 33 to a short range radio frequency link 35, such as a low power radio frequency link that may be a Bluetooth™ (BT) link or a WiFi link. In other embodiments the transceiver 31 may be optically based and may then include suitable optical source and detector components, such as an infrared emitter and an infrared detector.

It should be noted that the various input modalities 36 and output modalities 38 are exemplary, and not all may be present in a given implementation. For example, the smartphone may be used with just the display screen 16 and the keypad/keyboard 26, or with just the display screen 16 if the screen is touch sensitive to permit the user to enter information and commands. In some embodiments the user interface could be based solely on the use of voice recognition and voice synthesis, and no touch sensitive display screen may be needed at all.

The program 14A is assumed to include program instructions that, when executed by the data processor 12, enable the electronic device 10 to operate in accordance with an application program 14B. The program 14A can include the OS and any associated file system utilities depending on the implementation of the software architecture of the device 10.

In general, the various embodiments of the device 10 can include, but are not limited to, smartphones, personal digital assistants (PDAs) possibly having wireless communication capabilities, portable computing devices including tablets and e-readers possibly having wireless communication capabilities, GPS devices possibly having wireless communication capabilities, image capture devices such as digital cameras possibly having wireless communication capabilities, gaming devices possibly having wireless communication capabilities, music storage and playback appliances possibly having wireless communication capabilities, Internet appliances permitting wireless or wired Internet access and browsing, as well as portable units or terminals that incorporate combinations of such functions.

The memory 14 may be of any type suitable to the local technical environment and may be implemented using any suitable data storage technology, such as semiconductor-based memory devices, flash memory, magnetic memory devices and systems, optical memory devices and systems, fixed memory and removable memory. The data processor 12 may be of any type suitable to the local technical environment, and may include one or more of general purpose computers, special purpose computers, microprocessors, digital signal processors (DSPs) and processors based on multi-core processor architectures, as non-limiting examples.

The memory 14 is shown as including computer program code that implements the various apps (application programs) 14B that can be pre-installed in the device 10 or subsequently installed by the user, such as by being downloaded via one of the radio frequency links 34 or 35.

Figure 2:
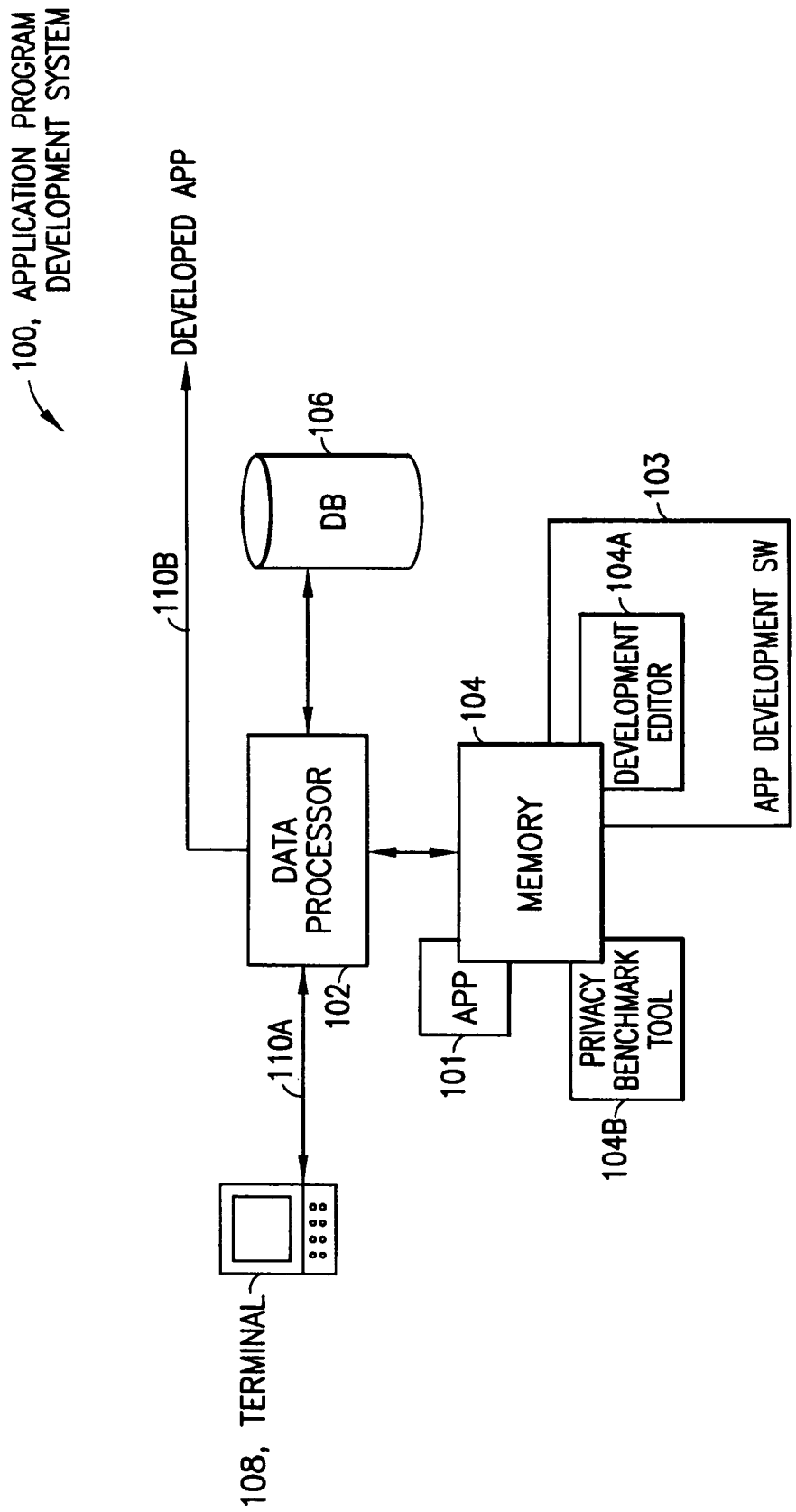
FIG. 2 is a block diagram of an application development system that is configured in accordance with exemplary embodiments of this invention.

FIG. 2 shows a high level block diagram of one non-limiting example of a computing system that is configured as an application program development system (APDS) 100. The APDS 100 may function as a mobile device application program development system. The APDS 100 includes at least one data processor 102 connected with at least one memory 104, such as semiconductor and/or disk, storing data and computer software including application development software (SW) 103 that includes an application program Development Editor (DE) 104A. In accordance with the embodiments of this invention the memory 104 may also store a Privacy Benchmark Tool (PBT) 104B (e.g., a software tool) that may be considered to be integrated at least to some extent with the functioning of the DE 104A. The APDS 100 may include or be otherwise connected with a database (DB) 106 that may store application program development-related code such as a library of sub-routines and functions. An application being developed may be stored in the memory 104 as an app 101. Not shown in FIG. 2 are other typically provided software such as, for example, an operating system (OS), a compiler, linking libraries and other types of conventional software development modules and programs. The APDS 100 also includes an interface 110A to at least one user terminal 108 providing a graphical user interface (GUI) for use by an application program developer. The APDS 100 also includes an interface 110B whereby the developed app 101 can be output (published), such as by being uploaded to an app store (not shown). Such a published app, when installed on the smartphone 10, becomes one of the apps 14B shown in FIG. 1.

In general, the at least one data processor 102 connected with at least one memory 104 and the various software and other components depicted in FIG. 2 can be considered as providing a computer assisted analysis of the application program 101 to determine at least one user privacy-related aspect of the application program, and to present the determined at least one user privacy-related aspect to a developer of the application program via at least the development editor 104A and the terminal 108. The various components illustrated in FIG. 2 may also be considered as representing various means for implementing the exemplary embodiments of this invention.

Note that the APDS 100 may be a self-contained system such as a workstation or a mainframe type of computing system. Alternatively the APDS 100 may be a distributed system (e.g., the data processor and memory 104 are physically present at one location, while DB 106 is physically present at another location). The APDS 100 could also be implemented in a cloud computing environment whereby the data processor 102 and related components and software exist as 'virtual' components and software that reside in the cloud, and whereby the application program developer gains access to the needed components and software via the terminal 108 and a suitable network such as the Internet. In this case then it should be appreciated that the functionality of the PBT 104B could be instantiated in the cloud and may not take the form of a discrete software program/module physically installed on and operating in a physical computing device at a specific location. However, and in general, even in the cloud computing embodiment any software code implementing the APDS 100 and/or the PBT 104B may be assumed to be stored somewhere on a non-transitory computer readable medium, such as on a memory accessible by a server.

As was suggested above the technical details to support the privacy benchmark tool 104B at different lifecycle stages of the mobile app development include at least the design phase, the development phase, the testing phase and the deployment phase. These various phases are now discussed in greater detail.

Design Phase

The goal at this phase is to perform a static privacy threat analysis of the app design. As input, assume that the app design includes the overall app architecture, package/class hierarchy and any invoked APIs. The input format can be any design specification language such as, but not limited to, Unified Modeling Language (UML). UML is a standardized general purpose modeling language used in the field of object-oriented software engineering. The UML includes a set of graphic notation techniques to create visual models of object oriented software systems.

Given an instance of an app design, what is of interest at this phase is how the app interacts with the smartphone (e.g., how it interacts with the specifics of the mobile device 10 described above in reference to FIG. 1), rather than the internal functional logic of the app. Interaction with the smartphone here refers to (by example): the smartphone components accessed by the app (e.g., sensors generally, or more specifically, for example, the microphone and/or the camera), the type of data collected from these components (sensors); (temporary) storage on the smartphone, and transmissions by the app to the outside world (e.g., via cellular network services, Bluetooth, etc.)

Interaction with the smartphone 10 may also include any incoming data into the smartphone that, for example, can affect how the smartphone behaves in response to the incoming data.

To infer this information from the app design the underlying framework/library used to interact with the smartphone is considered. As one non-limiting example the framework/library could be one known as Qt (QT is a registered trademark of Nokia Corporation)-Mobility (available from Nokia Corporation). A Qt Mobility API is organized into frameworks, e.g., Location, Contacts, Messaging, Multimedia, Sensors. Each framework, such as Location, includes a number of classes, e.g., QGeoPositionInfoSource, QGeoSatelliteInfoSource. Each class in turn includes access methods, e.g., public methods of the class QGeoPositionInfoSource include setUpdateInterval( ), setPreferredPositioningMethods( ).

Given such an exemplary framework that may be used by the app 14B to interact with the smartphone 10 a generic template is created with the classes/methods ranked according to their privacy sensitivity. Again taking the Qt Mobility API as a non-limiting example, an instance of the class QGeoPositionInfoSource created with enum value 'SatellitePositioningMethods' is considered herein to be more privacy sensitive than a class specifying 'NonSatellitePositioningMethods',' as satellite based methods are capable of determining location with higher accuracy than non-satellite based methods.

The above information is merged with other methods (if any) accessed in the same class, e.g., setUpdateInterval( ). As considered herein code specifying a lower update interval to access location data is less privacy sensitive than code specifying a higher frequency of access.

Such a privacy rating template may then be used to provide general guidelines while designing the app. Given an instance of the app design, the design is then parsed to identify the components, classes and methods interacting with the smartphone 10. Once identified the privacy template is used to highlight the more privacy sensitive parts of the code/architecture with alternatives proposed (wherever possible) to make the design more privacy friendly.

Coding

As with the design stage, the privacy ratings template can be used to provide real-time feedback to the app developer with respect to the developer's choice of classes, APIs used to interact with the smartphone, smartphone components accessed, etc. The result is the creation of more privacy efficient code.

Figure 3:
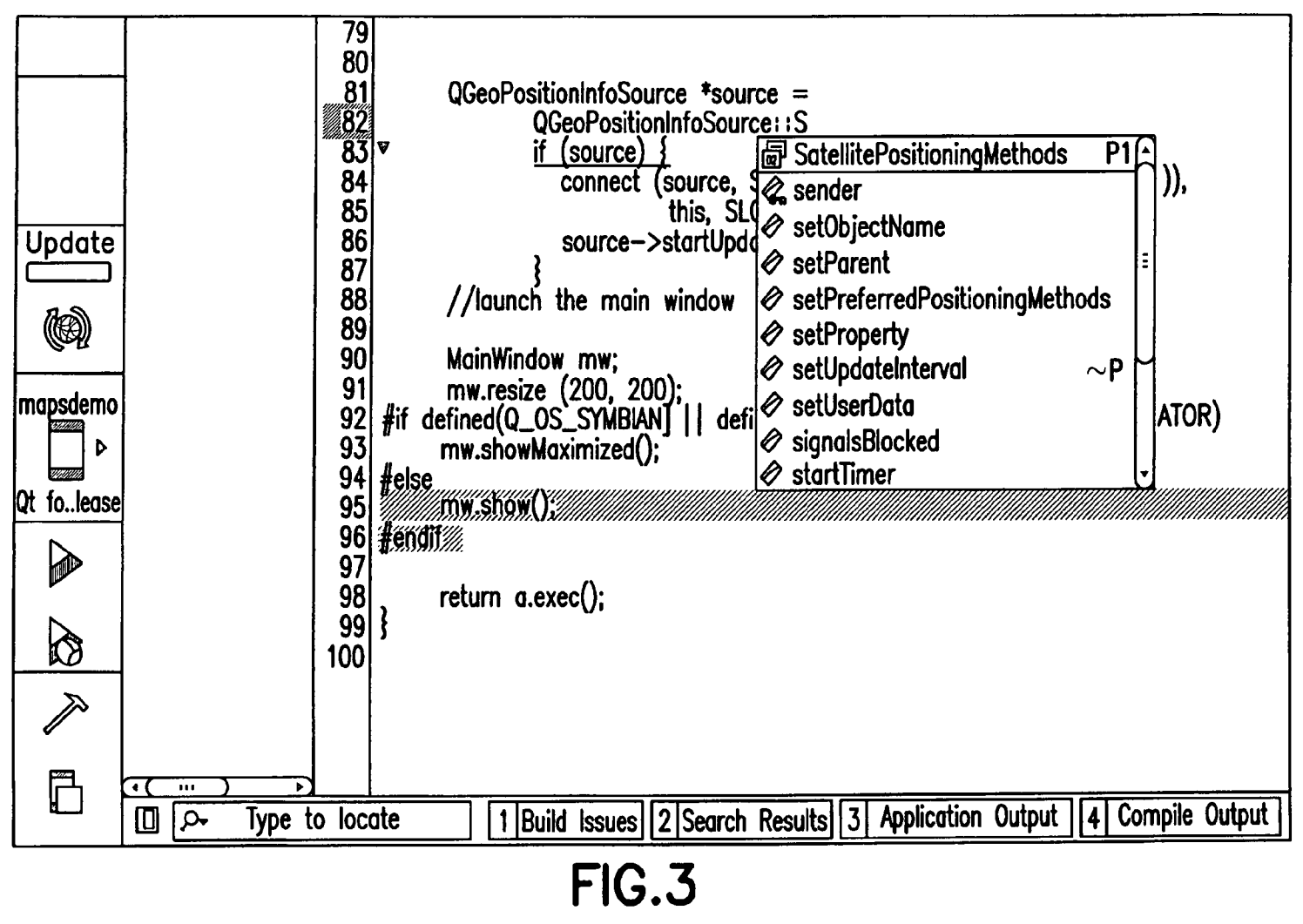

FIG. 3 is a screenshot that shows a sample of Qt Mobility APIs with feedback provided by the PBT 104B concerning the privacy sensitivity of each API integrated into Qt Creator. For instance, in the window "SatellitePositioningMethods" the "~P" next to the setUpdateInterval( ) method indicates to the app developer that the privacy sensitivity of the API invocation increases linearly with a higher frequency of the parameter value (the value that sets the update interval and hence the update frequency). Similarly, the "P1" next to the window title "SatellitePositioningMethods" indicates to the app developer that this API has a greater privacy sensitivity than does "NonSatellitePositioningMethods" (not shown in FIG. 3).

Testing

Testing involves performing privacy analysis of the app 101 being developed for different use cases of the app. One distinction here with respect to the privacy analysis performed during the design (coding) phase is that here there is also a consideration of the run-time characteristics, e.g. frequency of use, which is generally not determinable at the design phase.

Note that it is true that in some circumstances the frequency of accesses can also be determined statically (at least during coding). For example, if the setUpdateInterval( ) method is used then the frequency of access can be determined based on the assigned parameter value. On the other hand, if location is accessed in a more ad-hoc fashion using a requestUpdate( ) method, then the frequency of accesses can only be determined by actually running the code.

Figure 4:
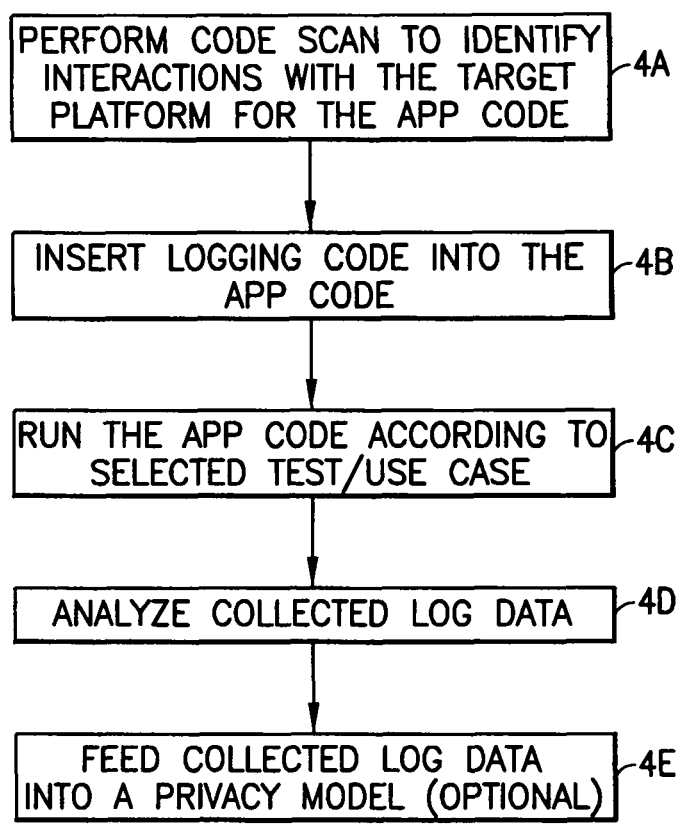
FIG. 4 is a logic flow diagram showing an example of app code run-time privacy testing by the Privacy Benchmark Tool shown in FIG. 2.

Run-time privacy testing is performed as follows. Reference is also made to the flowchart of FIG. 4, which illustrates the functioning of the PBT 104B:

(4A) A code scan is performed to identify the interactions with the smartphone (target platform for the app code), which includes as before the classes/methods of the smartphone platform API (e.g., the above-referenced Qt Mobility API).

(4B) Logging code is inserted into the app code to ensure that each such access is logged with a timestamp.

(4C) The app is run (executed) according to the test/use case.

(4D) The collected log data is analyzed to compute statistics such as, but not limited to, the frequency of accesses, the number of times a specific smartphone component was accessed, and in what contexts the smartphone component was accessed.

(4E) The logging information can also (optionally) be fed into a privacy model. One suitable type of privacy model is described in copending U.S. patent application Ser. No. 13/341,290, filed Dec. 30, 2011, "Method and Apparatus Providing Privacy Setting and Monitoring User Interface", by Imad Aad, Debmalya Biswas, GianPaolo Perrucci, Julien Eberle. FIG. 5 herein reproduces FIG. 4 from U.S. patent application Ser. No. 13/341,290 and shows an exemplary and non-limiting sample mapping between sensor data and personal information. More specifically, FIG. 5 shows an example of a matrix that maps what user personal information (e.g., Personal, Professional, Context, Social Connections, Location, Medical, Financial, etc.) can be inferred based on which sensors, information sources and input devices (e.g., the input modalities 36) of the of the device 10. Note that each personal information privacy category can include several sub-categories. For example, the Context personal information category could include as sub-categories: Transportation means, Activity and Mood. An exemplary list of sensors, data sources and input modalities includes, but is not limited to: GPS, WiFi, BT, Cell ID, Call logs, SMS, Audio, Accelerometer, Address book, Calendar, Picture, Music, TMEI, IMSI, Device profile, Ring type, Battery (charge) level and Charging indicator, all of which may be referred to generically as 'sensors'.

As is described in U.S. patent application Ser. No. 13/341,290 the data from various sensors can be combined to infer personal information, using algorithms that can be simple (e.g., instant location) to more complicated. As such, the 'X' in the table of FIG. 5 can refer to a simple dependency on a specific sensor S, or to more complex access patterns, e.g., "Sensors S1 and S2 need to be accessed with frequencies f1 and f2 within time periods t1 and t2 to infer context information C".

The privacy matrix as described in U.S. patent application Ser. No. 13/341,290 can be employed in accordance with an aspect of this invention to provide a high level description of the privacy implications of the app code and its potential use of the sensors of the smartphone 10.

Run-time privacy testing can also be performed on actual user traces (e.g., mobility, browsing, application usage, etc.) resulting in evaluations of privacy leakages in specific (and real) situations. These real traces can be contributed by researchers running specific field trials, or by users volunteering to participate. For the latter case, and after installing specific logging applications, the user's actions, movements, etc. can be recorded during actual use of the smartphone running the app being tested, and this data can then be uploaded to specific servers to be used for privacy evaluations.

Specific log traces from users can become "reference traces" for privacy benchmarking. For example, similar to video sequences that are used for evaluating video quality after transmission and coding errors, specific log traces from users can be used as context-references for evaluating privacy-leakages due to the developed app 101.

Figure 6:
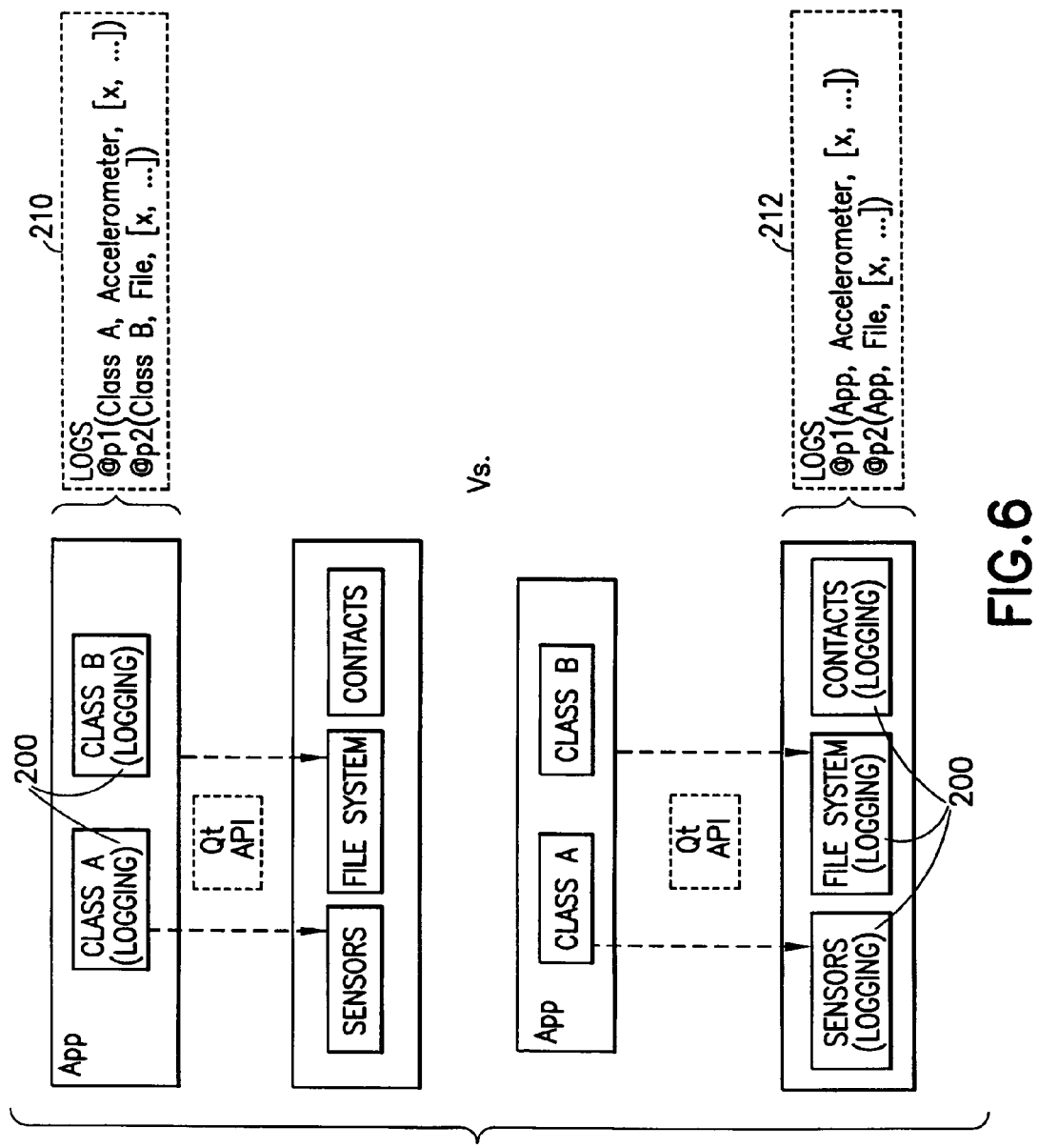
FIG. 6 shows a distinction between embedding logging code in components of an app being tested on a platform versus embedding logging code into components of the platform.

Privacy Leaks:

While the above-described testing is effective in determining the privacy sensitiveness of the different use-cases, a further exemplary aspect of this invention takes an orthogonal approach to detect any privacy leaks which may have been inadvertently left in the app code. To achieve this the app code can be considered as a 'black box', and in turn the method inserts logging code into the different input sources/components on the smartphone 10 and logs any access by the app 101. The difference between the two approaches is shown in FIG. 6, where the upper portion shows the insertion of logging code 200 into the app code (e.g., Class A, Class B) as described previously, while the lower portion shows the insertion of the logging code 200 into the components of the target platform (e.g., interfaces such as APIs, sensors, file system, contacts database, etc. of the smartphone 10).

Note the log file 210 in the upper portion shows the accesses of the Class A and Class B components of the app to the accelerometer (sensor) and file system at certain time instants, while the log file 212 in the lower portion (corresponding to the blackbox testing approach) shows the accesses by the app to the accelerometer (sensor) and file system. Each of these two log files 210 and 212 can be used independently for privacy evaluation/testing of the app code.

For example, the log file 210 may be used in scenarios when the app code is accessible (it is possible to insert logging code in the app code itself), and accesses to only specific sensors are monitored. The log file 212 on the other hand may be useful for those scenarios where the app code is not available (e.g., a third party component is used) and thus the logging operation needs to be performed by the middleware Qt API which is used to access phone sensors (this can also be at the OS/sensor driver level) In this latter scenario it is desirable to detect unintentional privacy leaks (e.g., a smartphone sensor was accessed which is either not required to be accessed or not allowed to be accessed) and for this use case purpose it is beneficial to monitor all sensors of the smartphone. In general this embodiment enables an analysis of the collected logging data to determine if there were any unexpected accesses by the app code to the underlying sensors.

Figure 7:
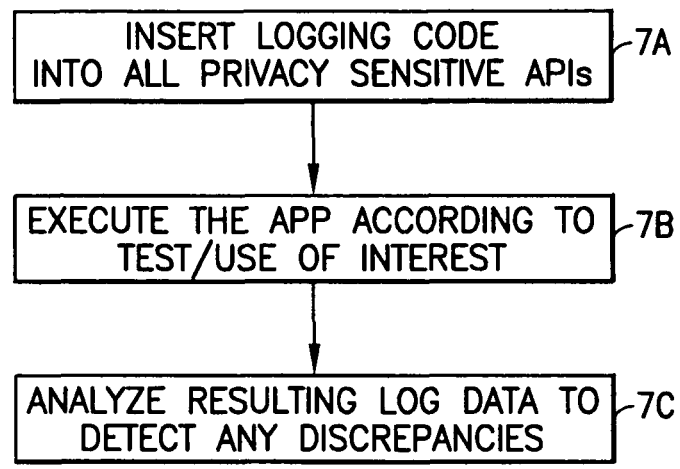
FIG. 7 is a logic flow diagram showing a method of black box testing by the Privacy Benchmark Tool shown in FIG. 2 to detect privacy leaks during execution of an app.

The black box testing to detect privacy leaks proceeds as follows with reference to FIG. 7.

(7A) Insert the logging code into all privacy sensitive APIs (e.g., Qt Mobility APIs). For example, the following code inserted into the QSensor reading( ) method code logs the app details each time a sensor is read: Timestamp; Sensor type; and the App reading the sensor.

```
std::cout << "@" << QDateTime::currentMSecsSinceEpoch( ) << " " <<
this->type( ).data( ) << "("
    << this->parent( )->metaObject( )->className( ) << ")" << std::endl;
```

(7B) The app is executed according to the test/use case.

(7C) The resulting log file(s) are analyzed to detect any unexpected discrepancies with respect to, for example, the components invoked, the storage used, the data transmitted, and the file system accessed. As was noted above, the analysis of the resulting log file(s) 212 may possibly indicate that a sensor, or file system, or a data file of the smartphone was unexpectedly accessed by the app code being tested, thereby indicating the potential for a privacy leak/violation.

Deployment

For a multi-platform app (one capable of execution on more than one specific platform), it is possible that the different platforms use a different privacy model to evaluate the app before publishing the app to the app store and thus making the app available to users. This is analogous in some respects to the different security models currently employed by different smartphone platforms (see, for example, "A Window Into Mobile Device Security", Carey Nachenberg, Symantec Security Response (2011)). For instance, while any certified app on one particular smartphone platform can access the same set of system resources, one a different type of platform a more fine grained approach can be taken where apps have to explicitly request access to system resources.

With respect to privacy as well different platforms can employ different privacy models. Given this fact the PBT 104B can aid the app developer by computing the privacy rating the app being developed will receive on a specific platform, allowing the developer to fine tune the privacy sensitive aspects of the app before actual submission to the corresponding app store.

At least one advantage and technical effect that is made possible by the use of the exemplary embodiments of this invention is that facilitates the task of the app developer with respect to a privacy evaluation of the app being developed, providing the developer with at least an estimate of the privacy aspects of the app from early in the development phase. The app developer is thus apprised even early in the development stage of how acceptable the app will be in terms of user privacy when installed and operated on a particular target platform.

Based on the foregoing it should be apparent that the exemplary embodiments of this invention provide a method, apparatus and computer program(s) to enhance an app developer's control over the level of privacy provided by an app being developed.

Note that while application program developer(s) may particularly benefit from the use of the exemplary embodiments of this invention others may benefit as well, such as the consumer or an auditor, etc., who wishes to verify the privacy aspects of a given application program.

Figure 8:
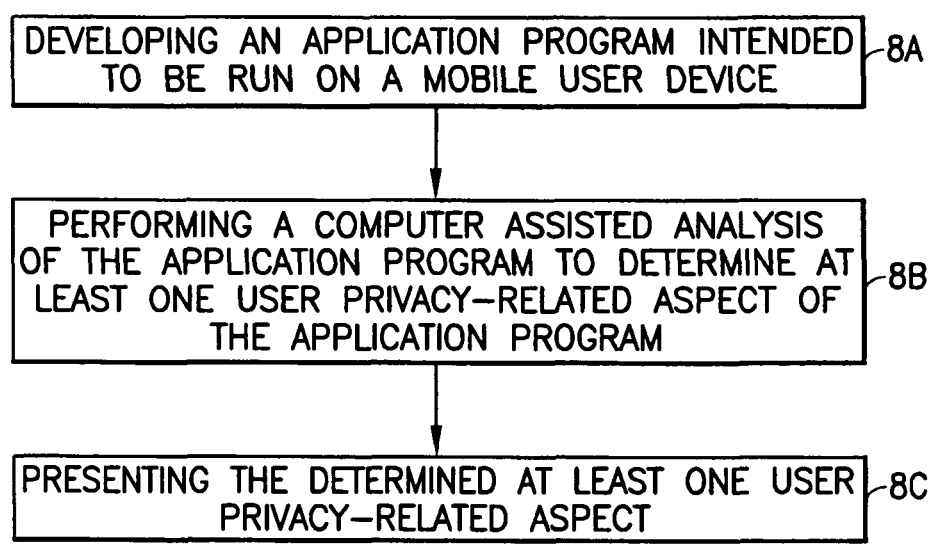
FIG. 8 is a logic flow diagram that illustrates the operation of a method, and a result of execution of computer program instructions, in accordance with the exemplary embodiments of this invention.

FIG. 8 is a logic flow diagram that illustrates the operation of a method, and a result of execution of computer program instructions, in accordance with the exemplary embodiments of this invention. In accordance with these exemplary embodiments a method performs, at Block 8A, developing an application program intended to be run on a mobile user device, at Block 8B a step of performing a computer assisted analysis of the application program to determine at least one user privacy-related aspect of the application program, and at Block 8C a step of presenting the determined at least one user privacy-related aspect.

The various blocks shown in FIG. 8 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

The exemplary embodiments thus may also encompass an apparatus that comprises at least one data processor and at least one memory including computer program code. The memory and computer program code are configured, with the at least one data processor, to cause the apparatus to develop an application program intended to be run on a mobile user device, to perform an analysis of the application program to determine at least one user privacy-related aspect of the application program; and to present the determined at least one user privacy-related aspect.

The exemplary embodiments thus may also encompass an apparatus that comprises means for developing an application program intended to be run on a mobile user device; means for performing a computer assisted analysis of the application program to determine at least one user privacy-related aspect of the application program; and means for presenting the determined at least one user privacy-related aspect.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected", "coupled", or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various development systems (e.g., Qt), APIs, class names, method names, etc. are not intended to be limiting in any respect, as these various development systems, APIs, class names method names may be identified by any suitable names. Further, the various names assigned to different sensors are not intended to be limiting in any respect, as these various sensors may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   in response to development of an application program intended to be run on a mobile user device, where the development is comprised of a plurality of development phases;
   performing a computer assisted analysis of the application program to determine at least one user privacy-related aspect of the application program; and
   presenting the determined at least one user privacy-related aspect;
   where one development phase is a testing phase, and where the computer-assisted analysis comprises inserting logging code into the application program, executing the application program, collecting logging data generated by the logging code, and analyzing the collected logging data to determine at least a frequency of accesses of the application program to components of the mobile user device, a number of times a specific component was accessed, and in what contexts the specific component was accessed.

2. The method as in claim 1, where presenting presents the determined at least one user privacy-related aspect to a developer of the application program.

3. The method as in claim 1, where one development phase is a design phase, and where the computer-assisted analysis comprises determining at least what components of the mobile user device are accessed by the application program, a type of data collected from accessed components, storage of the collected data and transmission of the collected data by the application program outside of the mobile user device.

4. The method of claim 3, where the computer-assisted analysis further comprises determining an effect of incoming data to the mobile user device.

5. The method as in claim 3 where the computer-assisted analysis considers an underlying software framework used to interact with the mobile user device, and considers classes and methods associated with the framework to create a template wherein the classes and methods are ranked according to their privacy sensitivity.

6. The method of claim 5, where another development phase is a coding phase, and where the template is used to provide feedback to an application developer with respect to the application developer's choices of at least classes, methods, and application program interfaces while coding the application program.

7. The method of claim 1, further comprising feeding the logging data into a user privacy model to determine an effect of the execution of the application program with respect to a plurality o fuser privacy categories and to determine any privacy implications of the application code in its use of components of the mobile user device.

8. The method of claim 1, where the computer-assisted analysis further comprises inserting logging code into at least some interfaces of the mobile user device, and analyzing the collected logging data to determine an occurrence of any unexpected accesses by the application program to the interfaces.

9. The method as in claim 1, where the application program is a multi-platform application program intended to be run on at least two different types of mobile user devices, and where performing the computer assisted analysis of the application program results in presenting a privacy rating of the application program for each of the at least two different types of mobile user devices.

10. A non-transitory computer-readable medium that contains software program instructions, where execution of the software program instructions by at least one data processor results in performance of operations that comprise execution of the method as claimed in claim 1.

11. An apparatus, comprising:
at least one data processor; and
at least one memory including computer program code, where the memory and computer program code are configured, with the at least one data processor, to respond to a development of an application program intended to be run on a mobile user device, where the development is comprised of a plurality of development phases, to perform an analysis of the application program to determine at least one user privacy-related aspect of the application program; and to present the determined at least one user privacy-related aspect;
where one development phase is a testing phase, and where the memory and computer program code are further configured with the at least one data processor, to insert logging code into the application program, to execute the application program, to collect logging data generated by the logging code, and to analyze the collected logging data to determine at least a frequency of accesses of the application program to components of the mobile user device, a number of times a specific component was accessed, and in what contexts the specific component was accessed.

12. The apparatus as in claim 11, where one development phase is a design phase, and where the memory and computer program code are further configured with the at least one data processor to determine at least what components of the mobile user device are accessed by the application program, a type of data collected from accessed components, storage of the collected data and transmission of the collected data by the application program outside o f the mobile user device.

13. The apparatus as in claim 12, where the memory and computer program code are further configured with the at least one data processor to determine an effect of incoming data to the mobile user device.

14. The apparatus as in claim 12, where the memory and computer program code are further configured with the at least one data processor to consider an underlying software framework used to interact with the mobile user device, and to consider classes and methods associated with the framework to create a template wherein the classes and methods are ranked according to their privacy sensitivity.

15. The apparatus as in claim 14, where another development phase is a coding phase, and where the memory and computer program code are further configured with the at least one data processor to use the template to provide feedback to an application developer with respect to the application developer's choices of at least classes, methods, and application program interfaces while coding the application program.

16. The apparatus of claim 11, where the memory and computer program code are further configured with the at least one data processor to feed the logging data into a user privacy model to determine an effect of the execution of the application program with respect to a plurality of user privacy categories and to determine any privacy implications of the application code in its use of components of the mobile user device.

17. The apparatus of claim 11, where the memory and computer program code are further configured with the at least one data processor to also insert logging code into at least some interfaces of the mobile user device and to analyze the collected logging data to determine an occurrence of any unexpected accesses by the application program to the interfaces.

18. The apparatus of claim 11, where the application program is a multi-platform application program intended to be run on at least two different types of mobile user devices, and where the memory and computer program code are further configured with the at least one data processor to present a privacy rating of the application program for each of the at least two different types of mobile user devices.

19. The apparatus as in claim 11, where the application program is a smartphone application program.

20. The apparatus as in claim 12, where the application program is a smartphone application program and where the components of the mobile user device comprise smartphone sensors.

21. The apparatus as in claim 17, where the application program is a smartphone application program, where the components of the mobile user device comprise smartphone sensors, and where at least some of the application program interfaces are associated with the smartphone sensors.

22. A method, comprising:

in a virtual instance of a computing system implemented in a computing cloud, performing an analysis during development of an application program intended to be executed on a mobile platform to determine at least one user privacy-related aspect of the application program, and presenting the determined at least one user privacy-related aspect;

where the development is comprised of a plurality of development phases, where one development phase is a testing phase, and where the analysis comprises inserting logging code into the application program, executing the application program, collecting logging data generated by the logging code, and analyzing the collected logging data to determine at least a frequency of accesses of the application program to components of the mobile user device, a number of times a specific component was accessed, and in what contexts the specific component was accessed.

23. The method as in claim 1, where the at least one user privacy-related aspect is comprised of a potential for the application program to cause an unintentional leak by the application program of a user's private data from the mobile device.

24. The apparatus as in claim 11, where the at least one user privacy-related aspect is comprised of a potential for the application program to cause an unintentional leak by the application program of a user's private data from the mobile device.

25. The method as in claim 22, where the at least one user privacy-related aspect is comprised of a potential for the application program to cause an unintentional leak by the application program of a user's private data from the mobile platform.

* * * * *